(12) United States Patent
Okubo et al.

(10) Patent No.: US 8,795,111 B2
(45) Date of Patent: Aug. 5, 2014

(54) BELT TYPE CONTINUOUSLY VARIABLE TRANSMISSION CONTROL SYSTEM

(75) Inventors: Yuzo Okubo, Wako (JP); Atsushi Sato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 251 days.

(21) Appl. No.: 13/142,570

(22) PCT Filed: Dec. 28, 2009

(86) PCT No.: PCT/JP2009/071775
§ 371 (c)(1),
(2), (4) Date: Jun. 28, 2011

(87) PCT Pub. No.: WO2010/079718
PCT Pub. Date: Jul. 15, 2010

(65) Prior Publication Data
US 2011/0275464 A1   Nov. 10, 2011

(30) Foreign Application Priority Data
Jan. 9, 2009  (JP) .................................. 2009-003538

(51) Int. Cl.
*F16H 61/662* (2006.01)

(52) U.S. Cl.
USPC ........................................................ 474/28

(58) Field of Classification Search
USPC ........................................................ 474/28
See application file for complete search history.

(56) References Cited

U.S. PATENT DOCUMENTS

| | | | |
|---|---|---|---|
| 4,674,363 A * | 6/1987 | Miyawaki ........................ 477/49 |
| 4,833,944 A * | 5/1989 | Tanaka ............................ 477/43 |
| 5,607,373 A * | 3/1997 | Ochiai et al. .................... 477/46 |
| 5,700,224 A | 12/1997 | Suzuki et al. |
| 5,924,508 A * | 7/1999 | Clauss et al. ................... 180/179 |
| 6,283,240 B1 * | 9/2001 | Beever ............................ 180/178 |
| 6,695,742 B2 * | 2/2004 | Hagiwara et al. ............... 477/46 |
| 6,757,603 B2 * | 6/2004 | Nozaki ............................ 701/51 |

(Continued)

FOREIGN PATENT DOCUMENTS

| | | |
|---|---|---|
| CN | 1755172 | 4/2006 |
| CN | 1971105 | 5/2007 |
| JP | 60-164056 A | 8/1985 |

(Continued)

OTHER PUBLICATIONS

Chinese Office Action dated Aug. 26, 2013 in corresponding Chinese Application No. 200980154061.0.

*Primary Examiner* — William E Dondero
*Assistant Examiner* — Mark K Buse
(74) *Attorney, Agent, or Firm* — Arent Fox LLP

(57) ABSTRACT

When a driver returns an accelerator pedal, preliminary pressure increase apparatus increases a line pressure to a preliminary pressure increase value according to the speed of return of an accelerator pedal detected by an accelerator pedal return speed sensor. When a braking state sensor detects that the speed of depression of a brake pedal is a predetermined value or above, pressure increase when braking apparatus further increases the line pressure from the preliminary pressure increase value to a slip preventing pressure increase value. The line pressure is increased to a preliminary pressure increase value when it is predicted that braking will be carried out subsequent to an accelerator pedal return operation, when subsequently there is sudden braking it becomes possible to increase the line pressure to a slip preventing pressure increase value that can prevent an endless belt from slipping accompanying sudden braking.

3 Claims, 4 Drawing Sheets

(56) References Cited

U.S. PATENT DOCUMENTS

| | | | |
|---|---|---|---|
| 7,670,239 B2 * | 3/2010 | Suzuki | 474/8 |
| 7,706,950 B2 | 4/2010 | Hino et al. | |
| 8,323,134 B2 | 12/2012 | Tsukada et al. | |
| 2007/0082769 A1 * | 4/2007 | Nihei et al. | 474/8 |
| 2009/0176618 A1 * | 7/2009 | Inoue | 477/44 |
| 2009/0298625 A1 * | 12/2009 | Kodama et al. | 474/11 |
| 2010/0035721 A1 * | 2/2010 | Rothenbuhler et al. | 477/45 |

FOREIGN PATENT DOCUMENTS

| | | |
|---|---|---|
| JP | 61-132430 A | 6/1986 |
| JP | 8-210450 A | 8/1996 |
| JP | 11-82707 A | 3/1999 |
| WO | WO 2008/044143 | 4/2008 |

\* cited by examiner

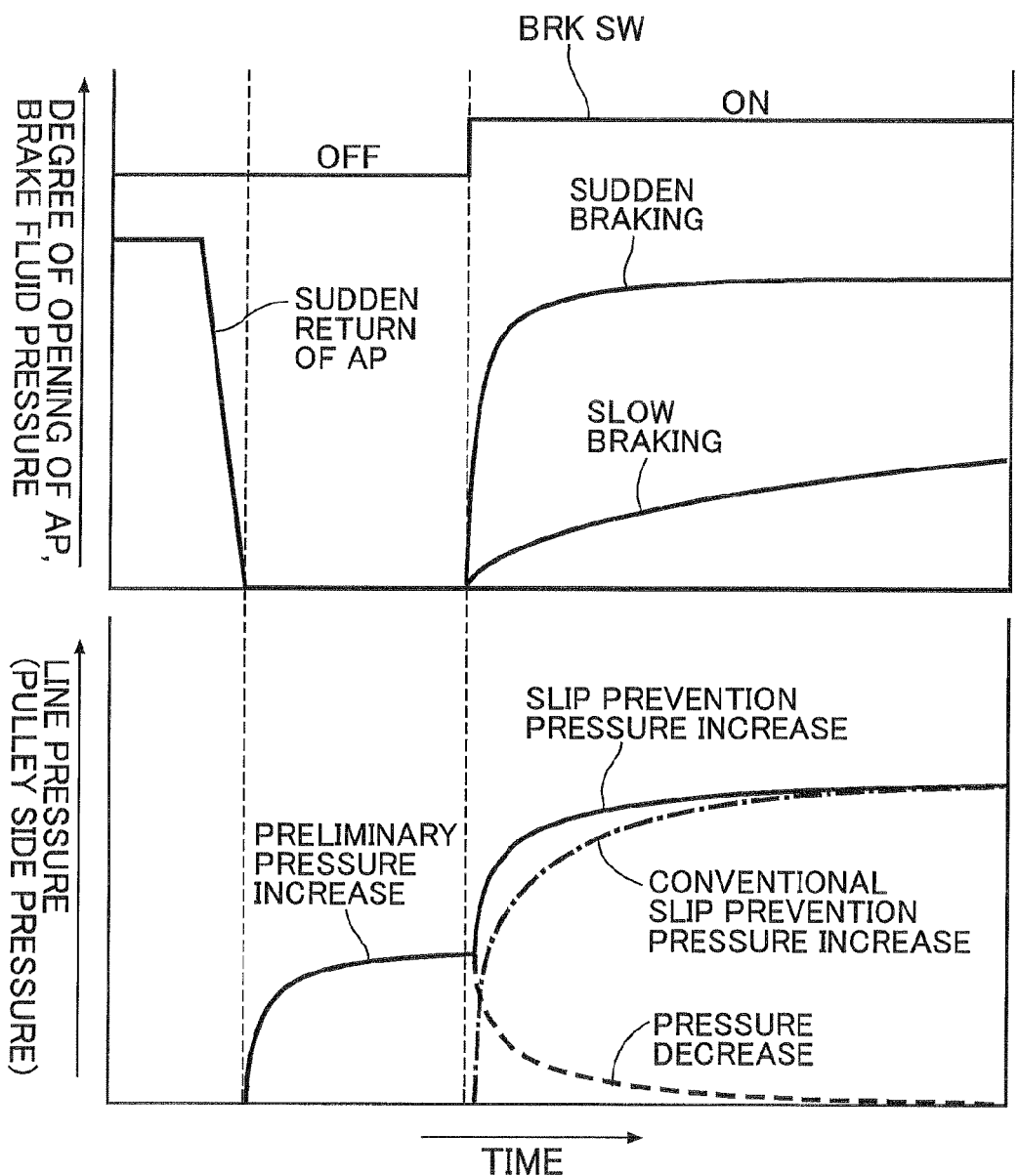

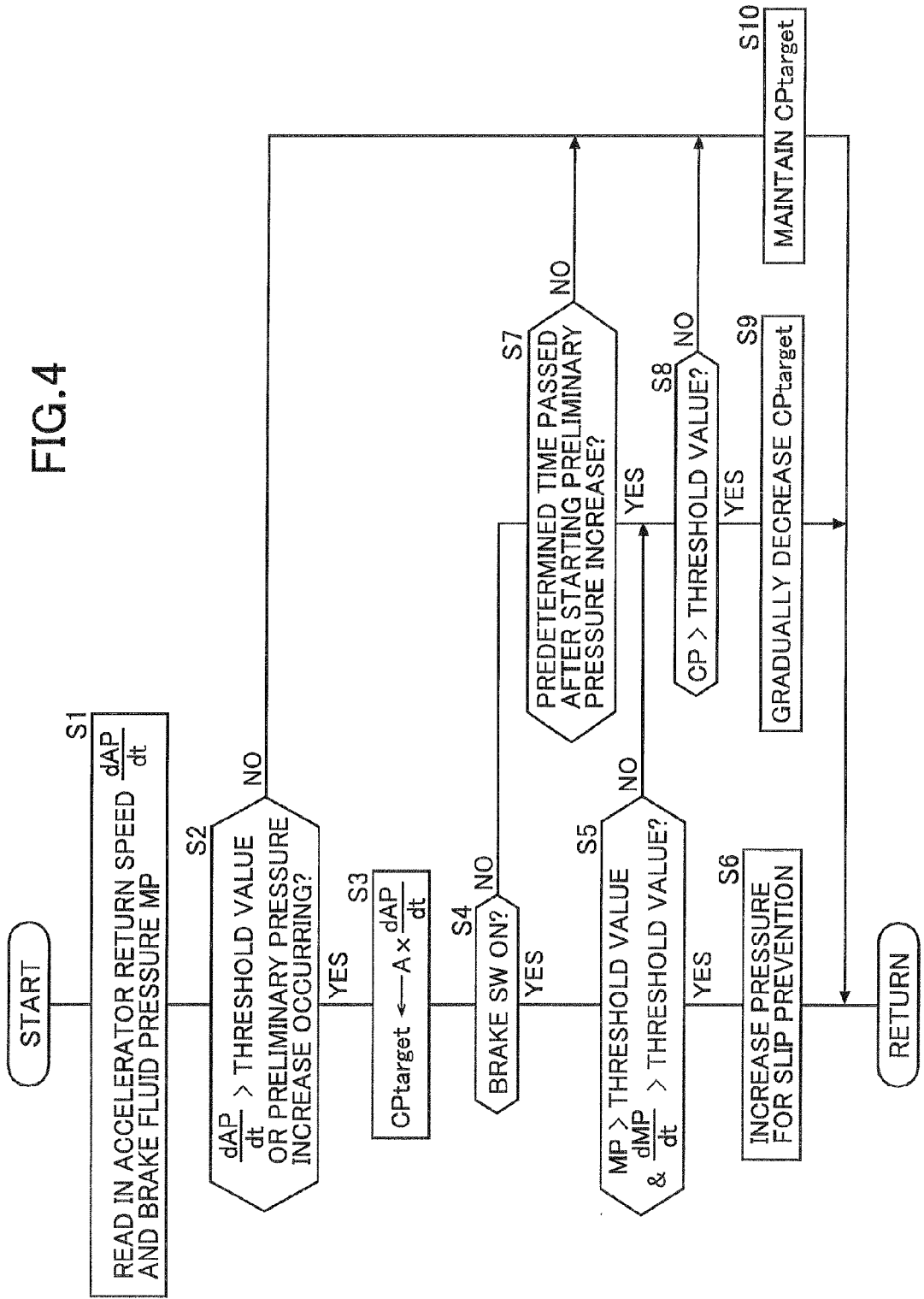

BELT TYPE CONTINUOUSLY VARIABLE TRANSMISSION CONTROL SYSTEM

CROSS-REFERENCE TO RELATED APPLICATION

This application is a National Stage entry of International Application No. PCT/JP2009/071775, filed Dec. 28, 2009, which claims priority to Japanese Patent Application No. 2009-003538 filed Jan. 9, 2009, the disclosure of the prior applications are incorporated in its entirety by reference.

TECHNICAL FIELD

The present invention relates to a belt type continuously variable transmission control system equipped with a drive pulley and a driven pulley having an endless belt wound therearound, a line pressure being exerted on a movable pulley half of either one of the drive pulley and the driven pulley and a control pressure made by reducing the line pressure being exerted on a movable pulley half of the other one thereof, thereby changing a ratio.

BACKGROUND ART

An arrangement in which a belt type continuously variable transmission has an endless belt wound around a drive pulley connected to an engine and a driven pulley connected to a driven wheel, a line pressure for applying a side pressure for holding the endless belt on the drive pulley and the drive pulley being increased when rotation of the driven pulley is suppressed by sudden braking, thereby preventing the endless belt from slipping relative to the drive pulley or the driven pulley, is known from the below-listed Patent Document 1.
Patent Document 1: Japanese Patent Application Laid-open No. 8-210450

DISCLOSURE OF INVENTION

Problems to be Solved by the Invention

Meanwhile, in the arrangement described in Patent Document 1 above, since the side pressure of the pulley is increased by increasing the line pressure after detecting a depression operation of a brake pedal by a driver, a time lag occurs between the brake pedal being depressed and the side pressure of the pulley increasing, and there is therefore a possibility that slipping of the endless belt cannot be prevented effectively.

The present invention has been accomplished in light of the above-mentioned circumstances, and it is an object thereof to control the side pressure of a pulley of a belt type continuously variable transmission with good responsiveness, thereby preventing effectively an endless belt from slipping.

MEANS FOR SOLVING THE PROBLEMS

In order to attain the above object, according to a first aspect of the present invention, there is proposed a belt type continuously variable transmission control system equipped with a drive pulley and a driven pulley having an endless belt wound therearound, a line pressure being exerted on a movable pulley half of either one of the drive pulley and the driven pulley and a control pressure made by reducing the line pressure being exerted on a movable pulley half of the other one thereof, thereby changing a ratio, the system comprising: an accelerator pedal return speed sensor for detecting a return speed of an accelerator pedal; a braking state sensor for detecting a braking state of a vehicle; preliminary pressure increase means for preliminarily increasing the line pressure to a preliminary pressure increase value according to the return speed of the accelerator pedal detected by the accelerator pedal return speed sensor; and pressure increase when braking means for further increasing the line pressure from the preliminary pressure increase value when the braking state sensor detects that speed of depression of a brake pedal is a predetermined value or greater after the accelerator pedal is returned.

Furthermore, according to a second aspect of the present invention, in addition to the first aspect, there is proposed the belt type continuously variable transmission control system, wherein the system comprises pressure reduction means for reducing the line pressure from the preliminary pressure increase value when the braking state sensor detects that the speed of depression of the brake pedal is less than a predetermined value after the accelerator pedal is returned.

Moreover, according to a third aspect of the present invention, in addition to the first aspect, there is proposed the belt type continuously variable transmission control system, wherein the system comprises pressure reduction means for reducing the line pressure from the preliminary pressure increase value when the braking state sensor does not detect depression of the brake pedal after the accelerator pedal is returned.

Furthermore, according to a fourth aspect of the present invention, in addition to the first aspect, there is proposed the belt type continuously variable transmission control system, wherein the preliminary pressure increase means continues said preliminary pressure increase until a predetermined time has passed after starting said preliminary pressure increase.

EFFECTS OF THE INVENTION

In accordance with the first aspect of the present invention, when a driver returns the accelerator pedal, the preliminary pressure increase means preliminarily increases the line pressure to a preliminary pressure increase value according to the speed of return of the accelerator pedal detected by the accelerator pedal return speed sensor, and subsequently when the braking state sensor detects that the speed of depression of the brake pedal is a predetermined value or above, the pressure increase when braking means further increases the line pressure from the preliminary pressure increase value. In this way, since the line pressure is increased to a preliminary pressure increase value when it is predicted that braking will be carried out subsequent to an accelerator pedal return operation, when subsequently there is sudden braking it becomes possible to increase the line pressure to a pressure that can prevent the endless belt from slipping with good responsiveness, thereby increasing the side pressure of the pulley and preventing effectively the endless belt from slipping accompanying sudden braking.

In accordance with the second aspect of the present invention, when it is detected that after the accelerator pedal has been returned the speed of depression of the brake pedal is less than a predetermined value, the line pressure, which has been preliminarily increased to a preliminary pressure increase value, is decreased by the pressure reduction means, it is possible to rapidly decrease the line pressure at a time when there is no possibility of slipping of the endless belt, thereby preventing the durability of the endless belt from being degraded due to excessive side pressure of the pulley.

In accordance with the third aspect of the present invention, since the line pressure, which has been increased to the preliminary pressure increase value, is decreased by the pressure reduction means if depression of the brake pedal is not detected after the accelerator pedal has been returned, it is possible to rapidly decrease the line pressure at a time when there is no possibility of slipping of the endless belt, thereby preventing the durability of the endless belt from being degraded due to excessive side pressure of the pulley.

In accordance with the fourth aspect of the present invention, since the preliminary pressure increase is continued until a predetermined time has passed since the preliminarily pressure increase started, it is possible to reliably prevent the endless belt from slipping.

BRIEF DESCRIPTION OF DRAWINGS

FIG. 3 is a time chart for explaining an operation (first embodiment).

FIG. 4 is a flowchart for explaining the operation (first embodiment).

EXPLANATION OF REFERENCE NUMERALS AND SYMBOLS

Figure 1:
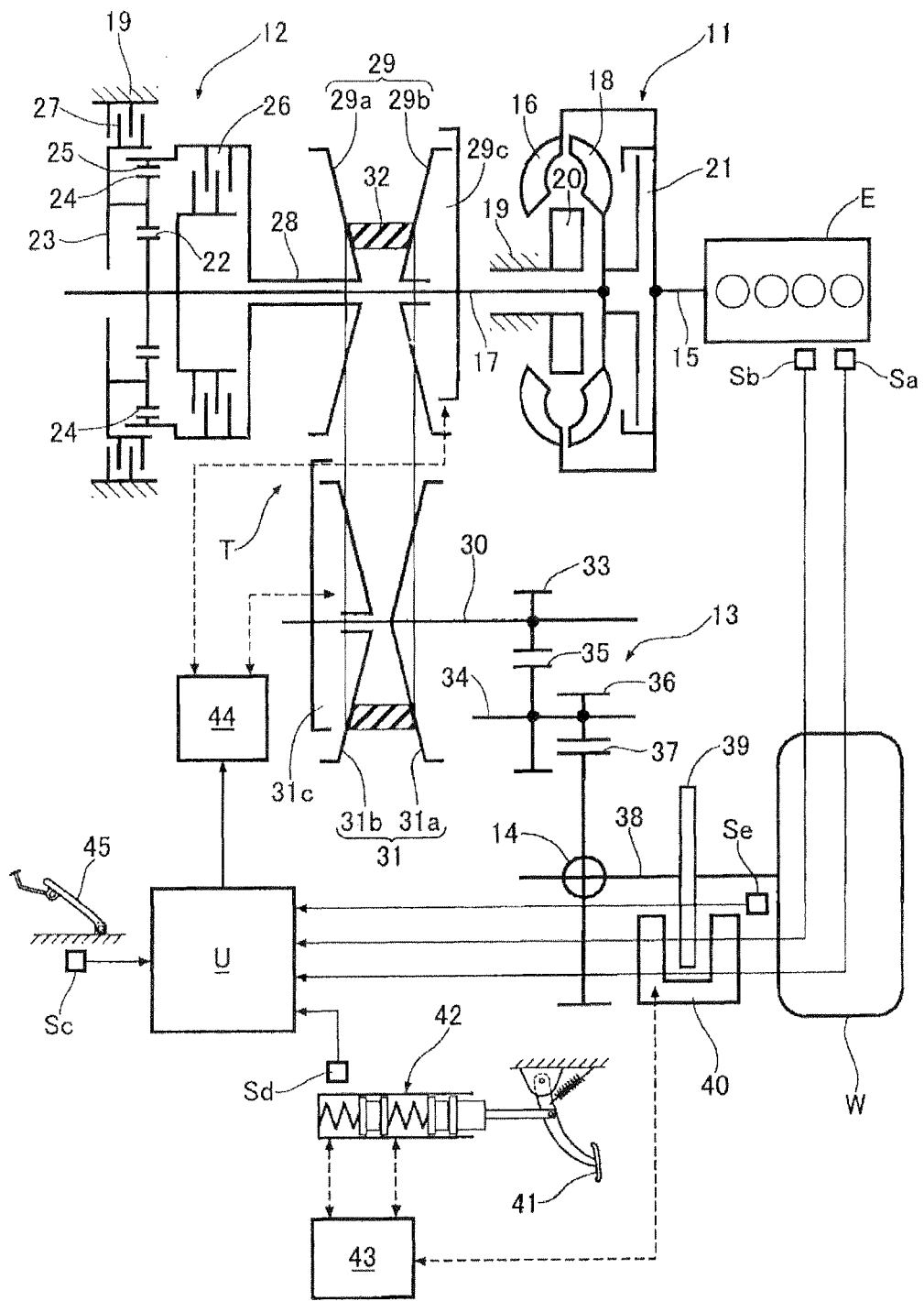
FIG. 1 is a diagram showing a driving force transmission system of a vehicle (first embodiment).

29 Drive pulley
29b Movable pulley half
31 Driven pulley
31b Movable pulley half
32 Endless belt
41 Brake pedal
45 Accelerator pedal
Sc Accelerator pedal return speed sensor
Sd Braking state sensor
M1 Preliminary pressure increase means
M2 Pressure increase when braking means
M3 Pressure reduction means

BEST MODE FOR CARRYING OUT THE INVENTION

A mode for carrying out the present invention is explained below by reference to FIG. 1 to FIG. 4.
First Embodiment FIG. 1 shows a driving force transmission system of a vehicle. Driving force of an engine E is transmitted to a wheel W via a torque converter 11, forward-reverse travel switching mechanism 12, a belt type continuously variable transmission T, a reduction gear train 13, and a differential gear 14. The torque converter 11 includes a pump 16 connected to a crankshaft 15 of the engine E, a turbine 18 connected to an input shaft 17, a stator 20 fixed to a casing 19, and a lockup clutch 21 directly connecting the crankshaft 15 to the input shaft 17. When the lockup clutch 21 is not operating, the torque converter 11 reduces the rotational speed of the crankshaft 15, amplifies the torque of the crankshaft 15, and transmits it to the input shaft 17.

The forward-reverse travel switching mechanism 12 employs a planetary gear mechanism and includes a sun gear 22 fixed to the input shaft 17, a plurality of pinions 24 supported on a planetary carrier 23 and meshing with the sun gear 22, and a ring gear 25 meshing with the pinions 24. The ring gear 25 can be connected to the input shaft 17 via a forward clutch 26, and the planetary carrier 23 can be connected to the casing 19 via a reverse brake 27.

When the forward clutch 26 is engaged, the input shaft 17 is directly connected to a pulley drive shaft 28, which is integral with the ring gear 25, and the pulley drive shaft 28 thereby rotates at the same speed and in the same direction as the input shaft 17. When the reverse brake 27 is engaged, the planetary carrier 23 is restrained by the casing 19, and the pulley drive shaft 28 is thereby reduced in speed relative to the rotational speed of the input shaft 17 and rotates in the reverse direction.

The belt type continuously variable transmission T includes a drive pulley 29 supported on the pulley drive shaft 28, a driven pulley 31 supported on an output shaft 30, and an endless belt 32 made from metal and wound around the drive pulley 29 and the driven pulley 31. The drive pulley 29 includes a fixed pulley half 29a fixed to the pulley drive shaft 28, and a movable pulley half 29b axially slidably and relatively non-rotatably supported on the pulley drive shaft 28 and urged toward the fixed pulley half 29a by virtue of fluid pressure acting on a fluid chamber 29c. The driven pulley 31 includes a fixed pulley half 31a fixed to the output shaft 30, and a movable pulley half 31b axially slidably and relatively non-rotatably supported on the output shaft 30 and urged toward the fixed pulley half 31a by virtue of fluid pressure acting on a fluid chamber 31c.

A line pressure is exerted on one of the fluid chamber 29c of the drive pulley 29 and the fluid chamber 31c of the driven pulley 31 (for example, the fluid chamber 29c of the drive pulley 29), and a control pressure made by reducing the line pressure by a control valve is exerted on the other (for example, the fluid chamber 31c of the driven pulley 31). If the difference in pressure between the line pressure and the control pressure is decreased the movable pulley half 29b of the drive pulley 29 moves away from the fixed pulley half 29a to thus reduce the effective diameter, and the movable pulley half 31b of the driven pulley 31 moves closer to the fixed pulley half 31a to thus increase the effective diameter, thereby changing the ratio of the belt type continuously variable transmission T toward the LOW side. In contrast thereto, if the difference in pressure between the line pressure and the control pressure is increased the movable pulley half 29b of the drive pulley 29 moves closer to the fixed pulley half 29a to thus increase the effective diameter, and the movable pulley half 31b of the driven pulley 31 moves away from the fixed pulley half 31a to thus reduce the effective diameter, thereby changing the ratio of the belt type continuously variable transmission T toward the OD (Over Drive) side.

A first reduction gear 33 provided on the output shaft 30 meshes with a second reduction gear 35 provided on a reduction shaft 34, and a final drive gear 36 provided on the reduction shaft 34 meshes with a final driven gear 37 of the differential gear 14. The wheel W is connected to left and right axles 38 extending from the differential gear 14, and a brake disk 39 provided on the wheel W can be braked by a brake caliper 40.

Brake fluid pressure outputted by a master cylinder 42 operated by a brake pedal 41 is transmitted to the brake caliper 40 via an ABS (antilock brake system) system 43 for preventing locking of the wheel W.

An electronic control unit U that controls the ratio by controlling the fluid pressure supplied to the fluid chambers 29c and 31c of the belt type continuously variable transmission T has connected thereto a degree of throttle opening sensor Sa, an engine rotational speed sensor Sb, an accelerator pedal return speed sensor Sc for detecting a return speed of an accelerator pedal 45, a braking state sensor Sd for detecting a brake fluid pressure generated by the master cylinder 42 operated by the brake pedal 41, and a brake switch Se for detecting depression of the brake pedal 41.

A target ratio for the belt type continuously variable transmission T is calculated from a degree of throttle opening detected by the degree of throttle opening sensor Sa and an engine rotational speed detected by the engine rotational speed sensor Sb, and the electronic control unit U controls the fluid pressure supplied to the fluid chambers 29c and 31c via a fluid pressure control system 44 so as to obtain the target ratio.

Meanwhile, when the wheel W is locked as a result of sudden braking, since rotation of the driven pulley 31 of the belt type continuously variable transmission T connected to the wheel W is suppressed, the endless belt 32 slips relative to the drive pulley 29 or the driven pulley 31, and the belt type continuously variable transmission T might be damaged. When there is a possibility of slipping of the endless belt 32 of the belt type continuously variable transmission T, that is, sudden braking is carried out, increasing the line pressure of the belt type continuously variable transmission T via the fluid pressure control system 44 increases the side pressure (pressure holding the endless belt 32) of the drive pulley 29 and the driven pulley 31, thus preventing slippage.

Figure 2:
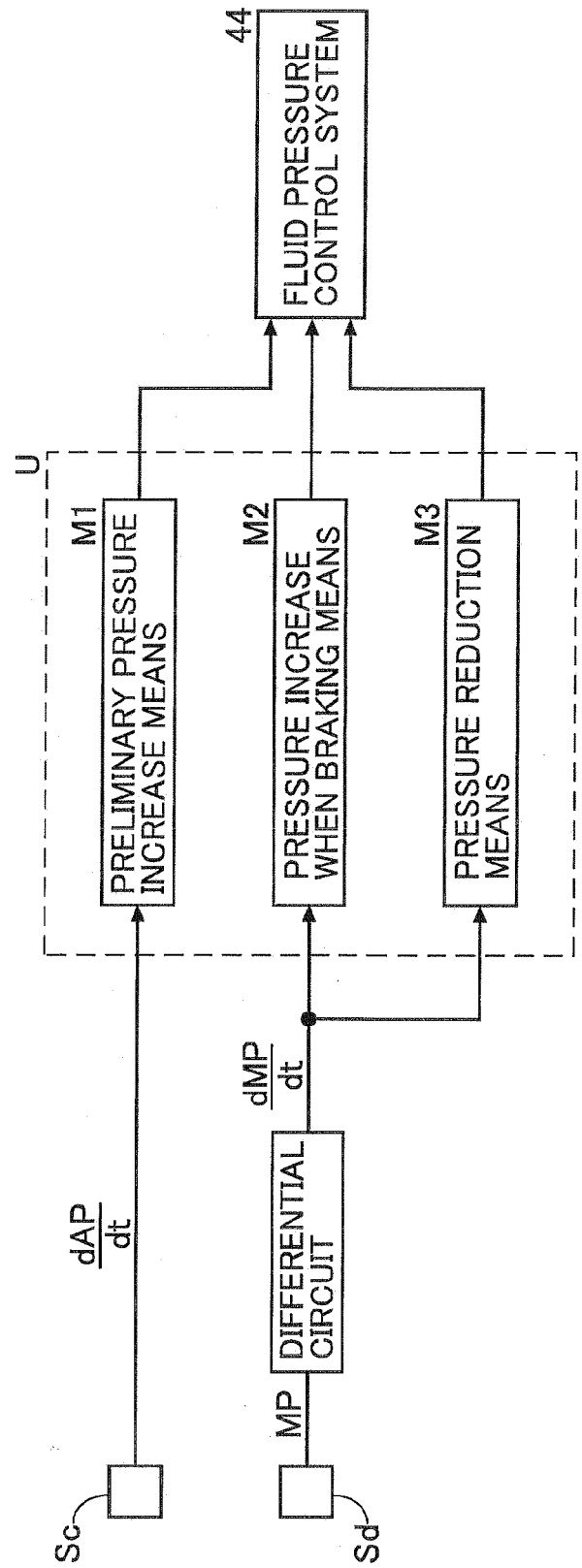
FIG. 2 is a block diagram of a pulley side pressure control system of an electronic control unit (first embodiment).

Because of this, as shown in FIG. 2, the electronic control unit U includes preliminary pressure increase means M1, pressure increase when braking means M2, and pressure reduction means M3. The preliminary pressure increase means M1 has connected thereto the accelerator pedal return speed sensor Sc, and the braking state sensor Sd is connected to the pressure increase when braking means M2 and the pressure reduction means M3 via a differential circuit.

As shown in FIG. 3, when the accelerator pedal return speed sensor Sc detects a sudden return operation of the accelerator pedal 45, the preliminary pressure increase means M1 preliminarily increases the line pressure of the belt type continuously variable transmission T to a preliminary pressure increase value via the fluid pressure control system 44. Subsequently, if the braking state sensor Sd detects a sudden depression operation of the brake pedal 41, the pressure increase when braking means M2 further increases the line pressure of the belt type continuously variable transmission T from the preliminary pressure increase value via the fluid pressure control system 44 (slip prevention pressure increase); even if the wheel W attains a locked state as a result of the sudden braking and the driven pulley 31 stops rotating, it is possible to increase the pulley side pressure of the drive pulley 29 and the driven pulley 31 to thus prevent the endless belt 32 from slipping, thereby protecting the belt type continuously variable transmission T from being damaged.

When braking is predicted in this way from a return operation of the accelerator pedal 45, the line pressure is increased to the preliminary pressure increase value; it therefore becomes possible, when subsequently there is sudden braking, to increase the line pressure with good responsiveness to a pressure that can prevent the endless belt 32 from slipping, thereby preventing effectively the endless belt 32 from slipping accompanying sudden braking. Furthermore, once the preliminary pressure increase starts, since the preliminary pressure increase continues without ceasing until a predetermined time has passed, it is possible to reliably prevent the endless belt 32 from slipping.

Even if the accelerator pedal return speed sensor Sc detects a sudden return operation of the accelerator pedal 45 and the line pressure is preliminarily increased to a preliminary pressure increase value, if the braking state sensor Sd does not detect a sudden depression operation of the brake pedal 41, it is determined that there is no possibility of slipping of the endless belt 32, and the pressure reduction means M3 gradually decreases the line pressure from the preliminary pressure increase value to a normal pressure.

Increasing the line pressure is not desirable from the viewpoint of durability of the belt type continuously variable transmission T even when the pressure increase is up to the preliminary pressure increase value, but when it is confirmed that there is no slipping of the endless belt 32 since braking is not carried out or since, if braking is carried out, it is not sudden braking, decreasing the line pressure from the preliminary pressure increase value enables the influence on durability of the belt type continuously variable transmission T caused by increasing the line pressure to the preliminary pressure increase value to be minimized Note that increase/decrease control of the line pressure of the belt type continuously variable transmission T has the same meaning as increase/decrease control of the pulley side pressure of the drive pulley 29 and the driven pulley 31.

The above-mentioned operation is further explained by reference to the flowchart of FIG. 4.

First, in step S1 a return speed dAP/dt of the accelerator pedal 45 detected by the accelerator pedal return speed sensor Sc and a brake fluid pressure MP generated by the master cylinder 42 detected by the braking state sensor Sd are read in. If in the subsequent step S2 the return speed dAP/dt of the accelerator pedal 45 exceeds a predetermined threshold value or the side pressure of the pulleys 29 and 31 of the belt type continuously variable transmission T is being applied (line pressure being increased from a normal value), then in step S3 a target pulley side pressure CPtarget for preliminary pressure increase is calculated from CPtarget=A×(dAP/dt). Here, A is a preset constant. As a result, the line pressure is increased in advance before the brake pedal 41 is depressed, and the preliminary pressure increase value at that time is proportional to the return speed dAP/dt of the accelerator pedal 45.

If in the subsequent step S4 it is confirmed that the brake switch Se is turned ON and the brake pedal 41 is depressed, and in step S5 the brake fluid pressure MP exceeds a predetermined threshold value and a time differential value dMP/dt of the brake fluid pressure MP exceeds a predetermined threshold value, that is, if a sudden braking is carried out, then in step S6 the line pressure is further increased to thus further increase the side pressure of the pulleys 29 and 31 in order to prevent the endless belt 32 from slipping.

If the answer in step S2 is NO, that is, if preliminary pressure increase is not carried out, then in step S10 the target pulley side pressure CPtarget is maintained at zero. If the answer in step S4 is NO, that is, if the brake pedal 41 is not depressed during the preliminary pressure increase, then in step S10 the target pulley side pressure CPtarget is maintained and the preliminary pressure increase is continued until a predetermined time has passed after starting the preliminary pressure increase in step S7. When the predetermined time has passed in step S7, if in step S8 the pulley side pressure CP (estimated value) exceeds a predetermined threshold value, that is, if the preliminary pressure increase is not yet completed, then in step S9 the target pulley side pressure CPtarget is gradually decreased and the preliminary pressure increase is gradually ceased. Furthermore, if in step S8 above the pulley side pressure CP (estimated value) is no greater than the predetermined threshold value, that is, if the preliminary pressure increase has already been completed, then in step S10 the target pulley side pressure CPtarget is maintained and the state of completion of the preliminary pressure increase is maintained.

If in step S5 above the brake fluid pressure MP does not exceed the predetermined threshold value or the time differential value dMP/dt of the brake fluid pressure MP does not exceed the predetermined threshold value, that is, if sudden braking is not carried out after the accelerator pedal 45 is suddenly returned, then the preliminary pressure increase is gradually ceased by moving to steps S8 to S10 above. It is thereby possible to minimize the influence on durability of the belt type continuously variable transmission T.

An embodiment of the present invention is explained above, but the present invention is not limited to the embodiment and may be modified in a variety of ways.

For example, the accelerator pedal return speed sensor Sc of the present invention is not limited to that of the embodiment in which the return speed of the accelerator pedal 45 is detected directly, and may be one that includes means for detecting the position of the accelerator pedal 45 and a differential circuit for the detected value.

Moreover, in the embodiment the braking state sensor Sd is formed from a sensor that detects the brake fluid pressure generated by the master cylinder 42, but it may be formed from a depressing force sensor, a stroke sensor, or a movement speed sensor for the brake pedal 41.

The invention claimed is:

1. A belt type continuously variable transmission control system equipped with a drive pulley and a driven pulley having an endless belt wound therearound, a line pressure being exerted on a movable pulley half of either one of the drive pulley and the driven pulley and a control pressure made by reducing the line pressure being exerted on a movable pulley half of the other one thereof, thereby changing a transmission ratio, the system comprising:

an accelerator pedal return speed sensor for detecting a return speed of an accelerator pedal; a braking state sensor for detecting a braking state of a vehicle; and an electronic control unit for controlling the transmission ratio, comprising:

preliminary pressure increase means for preliminarily increasing the line pressure to a preliminary pressure increase value according to the return speed of the accelerator pedal detected by the accelerator pedal return speed sensor;

pressure increase when braking means for further increasing the line pressure from the preliminary pressure increase value when, based on a signal from the braking state sensor, it is detected that speed of depression of a brake pedal is a predetermined value or greater while said line pressure is being increased by said preliminary pressure increase means to said preliminary pressure increase value; and pressure reduction means for reducing the line pressure from the preliminary pressure increase value when the braking state sensor does not detect depression of the brake pedal after the accelerator pedal is returned.

2. The belt type continuously variable transmission control according to claim 1, wherein the pressure reduction means reduces the line pressure from the preliminary pressure increase value when the braking state sensor detects that the speed of depression of the brake pedal is less than a predetermined value after the accelerator pedal is returned.

3. The belt type continuously variable transmission control system according to claim 1, wherein the preliminary pressure increase means continues said preliminary pressure increase until a predetermined time has passed after starting said preliminary pressure increase.

* * * * *